US012131895B2

(12) United States Patent
Hoyes et al.

(10) Patent No.: US 12,131,895 B2
(45) **Date of Patent: *Oct. 29, 2024**

(54) TIME OF FLIGHT MASS ANALYSER WITH SPATIAL FOCUSSING

(71) Applicant: Micromass UK Limited, Wilmslow (GB)

(72) Inventors: John Brian Hoyes, Stockport (GB); Boris Kozlov, Manchester (GB)

(73) Assignee: Micromass UK Limited, Wilmslow (GB)

( * ) Notice: Subject to any disclaimer, the term of this patent is extended or adjusted under 35 U.S.C. 154(b) by 183 days.

This patent is subject to a terminal disclaimer.

(21) Appl. No.: 17/717,505

(22) Filed: Apr. 11, 2022

(65) Prior Publication Data

US 2022/0238320 A1 Jul. 28, 2022

Related U.S. Application Data

(63) Continuation of application No. 16/617,068, filed as application No. PCT/GB2018/051320 on May 16, 2018, now Pat. No. 11,328,920.

(30) Foreign Application Priority Data

May 26, 2017 (GB) ..................................... 1708430

(51) Int. Cl.

*H01J 49/40* (2006.01)
*H01J 49/06* (2006.01)
*H01J 49/42* (2006.01)

(52) U.S. Cl.

CPC .......... *H01J 49/401* (2013.01); *H01J 49/061* (2013.01); *H01J 49/406* (2013.01); *H01J 49/408* (2013.01); *H01J 49/4245* (2013.01)

(58) Field of Classification Search

CPC ........ H01J 49/004; H01J 49/40; H01J 49/401; H01J 49/403; H01J 49/406; H01J 49/408; H01J 49/4245

See application file for complete search history.

(56) References Cited

U.S. PATENT DOCUMENTS

| | | | | |
|---|---|---|---|---|
| 6,833,544 B1 * | 12/2004 | Campbell | H01J 49/4225 | 250/284 |
| 11,328,920 B2 * | 5/2022 | Hoyes | H01J 49/40 | |
| 2001/0030284 A1 * | 10/2001 | Dresch | H01J 49/401 | 250/287 |
| 2004/0183007 A1 * | 9/2004 | Belov | H01J 49/401 | 250/282 |
| 2009/0121130 A1 * | 5/2009 | Satoh | H01J 49/022 | 250/287 |

(Continued)

*Primary Examiner* — David E Smith

(74) *Attorney, Agent, or Firm* — Goodwin Procter LLP

(57) ABSTRACT

A Time of Flight mass analyser is disclosed comprising: at least one ion mirror 34 for reflecting ions; an ion detector 36 arranged for detecting the reflected ions; a first pulsed ion accelerator 30 for accelerating an ion packet in a first dimension (Y-dimension) towards the ion detector 36 so that the ion packet spatially converges in the first dimension as it travels to the detector 36; and a pulsed orthogonal accelerator 32 for orthogonally accelerating the ion packet in a second, orthogonal dimension (X-dimension) into one of said at least one ion mirrors 34.

19 Claims, 4 Drawing Sheets

(56) References Cited

U.S. PATENT DOCUMENTS

| | | | | |
|---|---|---|---|---|
| 2011/0168880 | A1* | 7/2011 | Ristroph | H01J 49/406 250/282 |
| 2015/0028198 | A1* | 1/2015 | Grinfeld | H01J 49/0031 250/281 |
| 2016/0225598 | A1* | 8/2016 | Ristroph | H01J 49/063 |
| 2018/0315589 | A1* | 11/2018 | Oshiro | H01J 49/401 |

* cited by examiner

TIME OF FLIGHT MASS ANALYSER WITH SPATIAL FOCUSSING

CROSS-REFERENCE TO RELATED APPLICATIONS

This application is a continuation of U.S. patent application Ser. No. 16/617,068, filed on Nov. 26, 2019, which is a national phase filing claiming the benefit of and priority to International Patent Application No. PCT/GB2018/051320, filed on May 16, 2018, which claims priority from and the benefit of United Kingdom patent application No. 1708430.2 filed on May 26, 2017. The entire contents of these applications are incorporated herein by reference.

FIELD OF THE INVENTION

The present invention relates generally to mass spectrometers and in particular to time of flight mass analysers with improved spatial focusing.

BACKGROUND

Originally, time-of-flight (TOF) mass analysers were simulated and designed effectively as one-dimensional systems, only really concerned with the dimension in which the ions are reflected (X-dimension). The motion of the ions orthogonal to this dimension was left unrestricted, with no forces applied to the ions in these orthogonal dimensions. Conventionally, an ion mirror comprises a plurality of flat plate electrodes, each of which has an aperture through it for allowing the ions to pass into and through the mirror. Fine wire meshes are arranged in each aperture so as to maintain a flat electric field profile, i.e. not having components of the electric field orthogonal to the dimension of ion reflection (X-dimension). This configuration of mirror electrodes helps avoid the initial velocity components of the ions and their positions in the dimensions orthogonal to the dimension of reflection (X-dimension) from influencing the motion of the ions in the dimension of reflection (X-dimension). This avoids the initial orthogonal spread of the ion cloud from causing (cross-) aberrations, enabling the time of flight mass spectrometer to achieve fine spatial focusing in the dimension of reflection (X-dimension) despite the ion packets starting with relatively large sizes in the dimensions orthogonal to this dimension of reflection.

There has been an increasing demand to increase the resolving power of TOF mass spectrometers, which has unavoidably led to instruments having an increased flight path length between the orthogonal accelerator and the ion detector. If the motion of the ions in such instruments remains unrestricted in the dimensions orthogonal to the dimension of reflection, then in order to accommodate this the vacuum chamber and detector must be unacceptably large. The main approach in solving this issue has been to use ion optic focusing elements such as ion lenses. However, ion lenses are disadvantageous in that they mix orthogonal parameters and unavoidably introduce orthogonal aberrations. It is known to minimize orthogonal aberrations by using immersion lenses in gridless ion reflectors, e.g. as in WO 2010/008386. However, even in the best cases where such aberrations are minimized, the initial size of the ion packet in the dimensions orthogonal to the dimension of reflection must be severely restricted.

It is desired to focus ions in the dimensions orthogonal to the dimension of reflection without influencing the motion of the ions in the dimension of reflection and increasing the cross-aberrations.

SUMMARY

From a first aspect the present invention provides a Time of Flight mass analyser comprising:

at least one ion mirror for reflecting ions;

an ion detector arranged for detecting the reflected ions;

a first pulsed ion accelerator for accelerating an ion packet in a first dimension (Y-dimension) towards the ion detector so that the ion packet spatially converges in the first dimension as it travels to the detector; and a pulsed orthogonal accelerator for orthogonally accelerating the ion packet in a second, orthogonal dimension (X-dimension) into one of said at least one ion mirrors.

Embodiments of the present invention focus (or prevent excessive divergence of) the ion packet in the first dimension (i.e. in the direction of the ion detector) as it travels to the detector. This enables the detector to be relatively small in the first dimension. This also enable the ion packet at the first ion accelerator to be relatively large in the first dimension, allowing a reduced space-charge effect, increased mass analyser duty cycle, and increased sensitivity. Embodiments disclosed herein also enable the mass analyser to have a relatively high mass resolving power since cross-aberrations in the first and second dimensions are avoided. In the multi-reflecting TOF embodiments disclosed herein, the technique may be used to prevent ions dispersing in the first dimension and to prevent ions performing different numbers of ion mirror reflections before reaching the detector.

U.S. Pat. No. 6,020,586 discloses a TOF mass analyser that pulses ions out of the orthogonal accelerator in a manner so that they become time-space focused at the detector, i.e. in the dimension of mass separation. However, U.S. Pat. No. 6,020,586 does not disclose causing the ion packet to converge in a dimension orthogonal to the direction of mass separation as the ion packet travels towards the detector.

The first and second dimension are substantially orthogonal to each other.

The at least one ion mirror may be arranged and configured to reflect the ions in the second dimension (X-dimension).

The orthogonal accelerator may be configured to receive ions in a direction along the first dimension (Y-dimension) and comprises a voltage supply for applying a voltage pulse that accelerates the ions out in the second dimension (X-dimension).

The first ion accelerator is configured to pulse the ion packet out having a first length in the first dimension (Y-dimension), the orthogonal accelerator is configured to pulse the ion packet out having a second length in the first dimension (Y-dimension), and the detector is arranged such that the ion packet has a third length in the first dimension (Y-dimension) when it impacts the detector, wherein the third length may be shorter than or substantially the same as the first length and/or second length.

The ion packet may decrease in length in the first dimension (Y-dimension) substantially monotonously as the ion packet travels towards the detector.

The first ion accelerator may comprise a voltage supply for applying a voltage pulse that accelerates the ion packet in the first dimension (Y-dimension) such that the ion packet is spatially focused in the first dimension to a spatial focal point that is downstream of the first ion accelerator, and wherein the detector is arranged in the first dimension at the spatial focal point.

Alternatively, the detector may be arranged in the first dimension (Y-dimension) upstream or downstream of the spatial focal point, but at a location in the first dimension such that the ion packet is narrower (or substantially the same) in the first dimension than when it is pulsed out of the first ion accelerator and/or orthogonal accelerator.

The mass analyser may comprise electrodes defining a further ion acceleration region downstream of the first ion accelerator and a voltage supply for applying a potential difference across the further ion acceleration region so as to accelerate ions that have been pulsed out of the first ion accelerator in the first dimension (Y-dimension).

The potential difference across the further ion acceleration region may be an electrostatic potential difference for accelerating the ions passing therethrough.

The further ion acceleration region may be directly adjacent the first ion accelerator.

The voltage supply may be configured to generate an electric field within the further ion acceleration region that has a magnitude in the first dimension (Y-dimension) that is greater than the magnitude of the pulsed electric field in the first dimension within the first ion accelerator.

The at least one ion mirror may comprise a first ion mirror spaced apart from a second ion mirror, wherein the ion mirrors and detector are arranged and configured such that ions pulsed out of the orthogonal accelerator pass into the first ion mirror and are reflected between the ion mirrors and then onto the detector.

The first ion accelerator may be configured to pulse the ion packet in the first dimension (Y-dimension) so that the ions have sufficient energy in this dimension that they do not impact upon the orthogonal accelerator after they have been reflected from the first ion mirror.

The mass analyser may be configured to reflect the ion packet a total of n times in the ion mirrors; wherein a first distance, in the first dimension (Y-dimension), is provided between the centre of the ion extraction region of the orthogonal accelerator and the centre of the detector; and wherein the length of the extraction region of the orthogonal accelerator, in the first dimension (Y-dimension), is at least n times shorter than said first distance.

The mass analyser may comprise a mesh electrode at the exit of the ion accelerator and/or between the first ion accelerator and orthogonal accelerator.

The mass analyser may comprise a first voltage supply for applying a voltage to the first ion accelerator to pulse out the ion packet in the first dimension, a second voltage supply for applying a voltage to the orthogonal accelerator to pulse out the ion packet in the second dimension, and a controller for delaying the start time of the second pulse relative to the first pulse and/or the duration of the second pulse so that at least some of the ions pulsed out of the first ion accelerator are pulsed out of the orthogonal accelerator to the detector.

The controller may be configured to delay the timing of the second pulse relative to the first pulse based on a pre-set or selected upper and/or lower threshold mass to charge ratio desired to be analysed so that the ions reaching the detector have masses below the upper threshold mass to charge ratio and/or above the lower threshold mass to charge ratio.

The mass analyser may comprise an input interface for inputting into the mass analyser the upper and/or lower threshold mass to charge ratio desired to be analysed.

The at least one ion mirror may be configured to reflect ions in a reflection dimension and either: (i) the first dimension is orthogonal to the reflection dimension; or (ii) the reflection dimension is at an acute or obtuse angle to the second dimension in the plane defined by the first and second dimensions. In embodiments according to option (ii), the ion packet is pulsed along the first dimension (Y-dimension) by the first ion accelerator so that the ion packet begins to converge along the first dimension. The ions are also orthogonally accelerated in the second dimension (X-dimension). The ion packet may subsequently be deflected such that the primary direction in which said convergence occurs is orthogonal to the dimension in which the ions are reflected by the ion mirror(s). The ion detector may have a substantially planar ion detecting surface arranged either substantially parallel to the first dimension (Y-dimension) or at an acute or obtuse angle to the first dimension in a plane defined by the first and second dimensions (X-Y plane).

The mass analyser may be configured such that the ion flight path length between the orthogonal accelerator and the detector is greater in the second dimension than in the first dimension.

The mass analyser may comprise one or more vacuum pump and vacuum chamber for maintaining the first ion accelerator and/or orthogonal accelerator at a pressure of either: $\leq 10^{-3}$ mbar; $\leq 0.5\times10^{-4}$ mbar; $\leq 10^{-4}$ mbar; $\leq 0.5\times10^{-5}$ mbar; $\leq 10^{-5}$ mbar; $\leq 0.5\times10^{-6}$ mbar; $\leq 10^{-6}$ mbar; $\leq 0.5\times10^{-7}$ mbar; or $\leq 10^{-7}$ mbar.

The present invention also provides a mass spectrometer comprising the mass analyser described herein and an ion source for supplying ions to the mass analyser.

The ion source may be a continuous ion source.

The mass spectrometer may be configured to supply ions to the first ion accelerator in the first dimension (Y-dimension).

The mass spectrometer may comprise either: an ionisation source inside the first ion accelerator; or an ionisation source configured to emit photons, charged particles or molecules into the first ion accelerator for ionising analyte therein.

The present invention also provides a method of Time of Flight mass analysis comprising:

- providing a mass analyser as described herein;
- pulsing an ion packet out of the first pulsed ion accelerator so that the ion packet spatially converges in the first dimension (Y-dimension) as it travels to the detector;
- orthogonally accelerating the ion packet in a second dimension (X-dimension) in the orthogonal accelerator so that the ions travel into one of said at least one ion mirror;
- reflecting the ions in the at least one ion mirror such that the ions are reflected onto the detector; and
- determining the mass to charge ratio of the detected ions.

The ions may be pulsed in the first dimension by the first ion accelerator prior to being pulsed in the second dimension by the orthogonal accelerator, or vice versa.

The mass to charge ratio of any given ion may be determined from the flight path length between the orthogonal accelerator and the detector (which is substantially the same for all ions), and the duration of time between pulsing the ion from the orthogonal accelerator to the ion being detected at the detector.

The present invention also provides a method of mass spectrometry comprising a method of mass analysis as described herein.

The spectrometers disclosed herein may comprise an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MATT") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; and (xxix) a Surface Assisted Laser Desorption Ionisation ("SALDI") ion source.

The spectrometer may comprise one or more continuous or pulsed ion sources.

The spectrometer may comprise one or more ion guides.

The spectrometer may comprise one or more ion mobility separation devices and/or one or more Field Asymmetric Ion Mobility Spectrometer devices.

The spectrometer may comprise one or more ion traps or one or more ion trapping regions.

The spectrometer may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The ion-molecule reaction device may be configured to perform ozonlysis for the location of olefinic (double) bonds in lipids.

The spectrometer may comprise one or more energy analysers or electrostatic energy analysers.

The spectrometer may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The spectrometer may comprise a device or ion gate for pulsing ions; and/or a device for converting a substantially continuous ion beam into a pulsed ion beam.

The spectrometer may comprise a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser.

The spectrometer may comprise a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The spectrometer may comprise a device arranged and adapted to supply an AC or RF voltage to the electrodes. The AC or RF voltage optionally has an amplitude selected from the group consisting of: (i) about <50 V peak to peak; (ii) about 50-100 V peak to peak; (iii) about 100-150 V peak to peak; (iv) about 150-200 V peak to peak; (v) about 200-250 V peak to peak; (vi) about 250-300 V peak to peak; (vii) about 300-350 V peak to peak; (viii) about 350-400 V peak to peak; (ix) about 400-450 V peak to peak; (x) about 450-500 V peak to peak; and (xi) >about 500 V peak to peak.

The AC or RF voltage may have a frequency selected from the group consisting of: (i)< about 100 kHz; (ii) about 100-200 kHz; (iii) about 200-300 kHz; (iv) about 300-400 kHz; (v) about 400-500 kHz; (vi) about 0.5-1.0 MHz; (vii) about 1.0-1.5 MHz; (viii) about 1.5-2.0 MHz; (ix) about 2.0-2.5 MHz; (x) about 2.5-3.0 MHz; (xi) about 3.0-3.5 MHz; (xii) about 3.5-4.0 MHz; (xiii) about 4.0-4.5 MHz; (xiv) about 4.5-5.0 MHz; (xv) about 5.0-5.5 MHz; (xvi) about 5.5-6.0 MHz; (xvii) about 6.0-6.5 MHz; (xviii) about 6.5-7.0 MHz; (xix) about 7.0-7.5 MHz; (xx) about 7.5-8.0 MHz; (xxi) about 8.0-8.5 MHz; (xxii) about 8.5-9.0 MHz; (xxiii) about 9.0-9.5 MHz; (xxiv) about 9.5-10.0 MHz; and (xxv) >about 10.0 MHz.

The spectrometer may comprise a chromatography or other separation device upstream of an ion source. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i) < about 0.0001 mbar; (ii) about 0.0001-0.001 mbar; (iii) about 0.001-0.01 mbar; (iv) about 0.01-0.1 mbar; (v) about 0.1-1 mbar; (vi) about 1-10 mbar; (vii) about 10-100 mbar; (viii) about 100-1000 mbar; and (ix) >about 1000 mbar.

Analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

The spectrometer may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation.

BRIEF DESCRIPTION OF THE DRAWINGS

Various embodiments will now be described, by way of example only, and with reference to the accompanying drawings in which.

DETAILED DESCRIPTION

Figure 1:
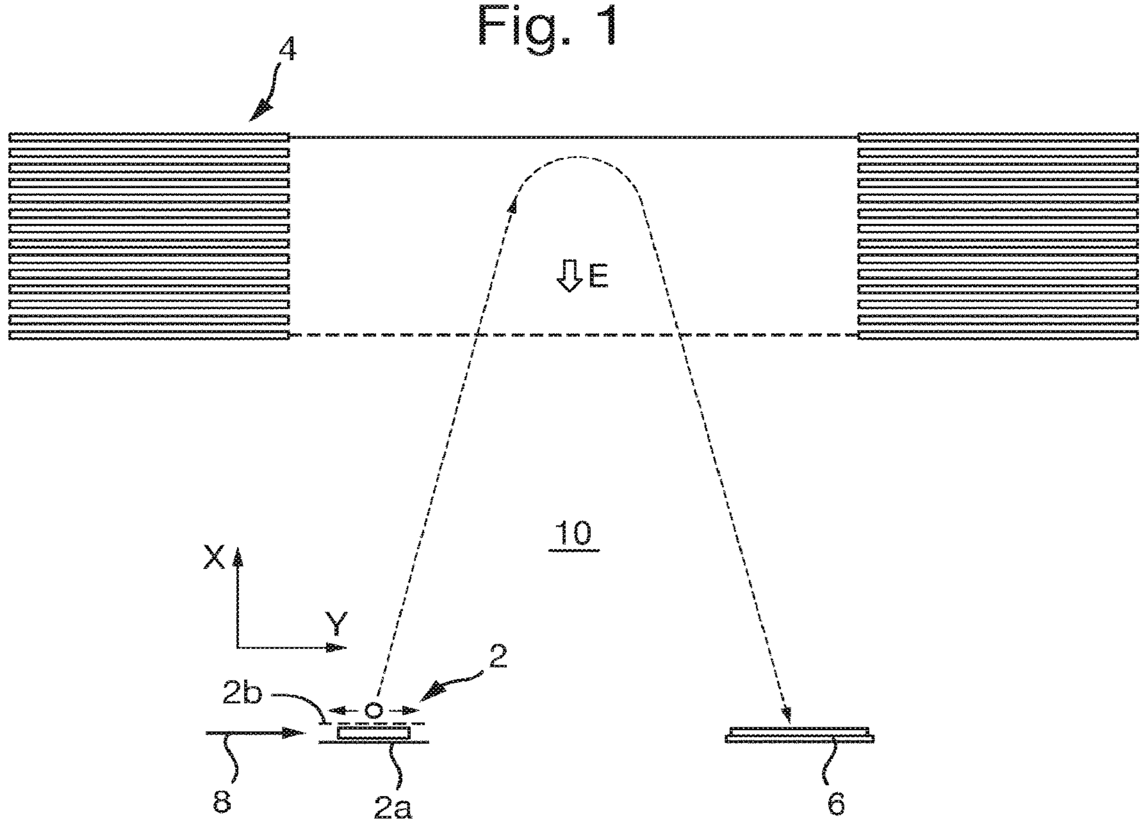
FIG. 1 shows a schematic of a conventional time-of-flight (TOF) mass analyser.

FIG. 1 shows a schematic of a conventional time-of-flight (TOF) mass analyser comprising an orthogonal ion accelerator 2, an ion mirror 4 and an ion detector 6. The orthogonal accelerator 2 comprises a pusher electrode 2*a* and a mesh electrode 2*b* for orthogonally accelerating ions into the ion mirror. The ion mirror 4 comprises a plurality of plate electrodes, wherein each plate electrode has an aperture therethrough for allowing ions to pass into the ion mirror and be reflected back out of the ion mirror. The detector 6 is arranged such that ions reflected out of the ion mirror are detected by the detector 6.

In operation, ions 8 are transmitted along an ion entrance axis (Y-dimension) into the orthogonal accelerator 2 to the space between the pusher and mesh electrodes. Voltage pulses are applied between the pusher and mesh electrodes so as to orthogonally accelerate the ions (in the X-dimension). The ions therefore maintain their component of velocity along the ion entrance axis (Y-dimension) but also gain an orthogonal component of velocity (in the X-dimension). The ions pass through the mesh electrode 2*b* and travel into an electric-field free region 10 between the orthogonal accelerator 2 and the ion mirror 4. The ions begin to separate (in the X-dimension) according to their mass to charge ratios as they travel towards the ion mirror 4. Voltages are applied to the electrodes of the ion mirror 4 so as to generate an electric field in the ion mirror that causes the ions to be reflected (in the X-dimension) and to be spatially focused (in the X-dimension) when they reach the detector 6. The reflected ions then leave the ion mirror 4 and pass back into the field-free region 10 and travel onwards to the ion detector 6. As described above, the ions separate in the dimension of orthogonal acceleration (X-dimension) as they pass from the orthogonal accelerator 2 to the ion detector 6. As such, for any given ion, the duration of time between the ion being pulsed by the orthogonal accelerator 2 to the time that it is detected at the ion detector 6 can be used to determine its mass to charge ratio.

However, the ions have a spread of speeds along the dimension of the entrance axis (Y-dimension) at the orthogonal accelerator 2. As such, each packet of ions that is pulsed out of the orthogonal accelerator 2 becomes longer in this dimension by the time it reaches the ion detector 6, thus requiring a relatively large ion detector 6 in order to detect a significant proportion of the ions in the ion packet.

It is desired to focus the ions in the dimension of the ion entrance axis so as to minimise, prevent or reduce the spreading of the ion packet in this dimension between the orthogonal accelerator 2 and the ion detector 6. Embodiments of the present invention provide spatial focusing of the ions in the direction from the orthogonal accelerator to the ion detector (Y-dimension) that is independent of the time of flight focusing (in the X-dimension), without mixing ion motion in the two dimensions (i.e. X and Y dimensions).

Figure 2A:
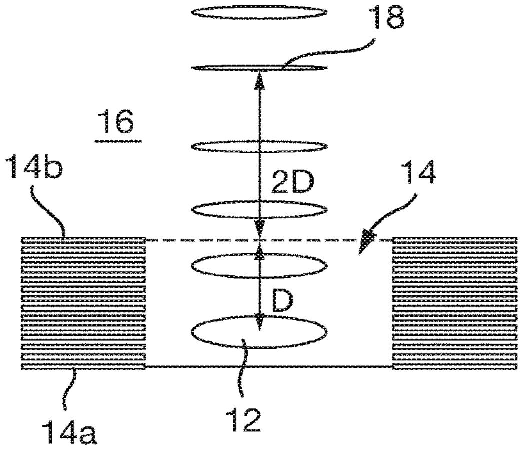
FIGS. 2A and 2B illustrate the focusing principle used in embodiments of the invention.
Figure 2B:
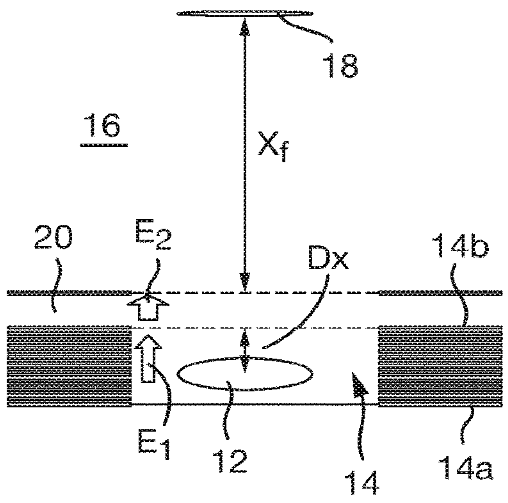

FIGS. 2A and 2B illustrate the focusing principle used in embodiments of the invention. FIG. 2A shows an ion cloud 12 arranged in a first acceleration region 14 between two electrodes 14*a*,14*b*. If a voltage difference is applied between the electrodes such that a homogeneous first electric field is arranged therebetween, the ions will be accelerated out of the first acceleration region 14 in a first direction and into a field-free region 16. This causes the ion cloud to become spatially focused in the first direction up until a focal point 18 at which the cloud has a minimum width in the first direction. The ions diverge from each other in the first direction downstream of this focal point 18. Assuming the ion cloud is initially arranged within the first acceleration region 14 such that its centre is a distance D from the exit of the first acceleration region 14, then the focal point 18 is located at a distance of 2D from the exit of the first acceleration region 14. It is possible to increase the distance of the focal point 18 from the exit of the first acceleration region 14 by arranging a second acceleration region at the exit of the first acceleration region 14, wherein the second acceleration region has a second electric field applied across it that is stronger than the first electric field. FIG. 2B shows a schematic of such an arrangement.

FIG. 2B shows an ion cloud 12 arranged in the first acceleration region 14 between two electrodes 14*a*,14*b*. As described above, a voltage difference is applied between the electrodes 14*a*,14*b* such that a first electric field $E_1$ accelerates ions out of the first acceleration region 14 in a first direction. The ions are accelerated into a second acceleration region 20, across which a second electric field $E_2$ is applied. The second electric field $E_2$ accelerates the ions in the first direction and has a greater magnitude than the first electric field. The ions exit the second acceleration region 20 into a field-free region 16 and become spatially focused in the first direction up until a focal point 18 at which the cloud has a minimum width in the first direction. The ions diverge from each other in the first direction downstream of this focal point 18. The distance of the focal point 18 from the exit of the second acceleration region 20 is represented in FIG. 2A as distance $X_f$, which is greater than the focal distance 2D in FIG. 2A. Such focusing techniques are known from Wiley and McLaren.

The inventors have recognised that such spatial focusing techniques may be used in TOF mass analysers in order to spatially focus the ions in a dimension orthogonal to the dimension in which the ions are reflected by the ion mirror (s), i.e. in a dimension orthogonal to the X-dimension. Embodiments described herein enable such spatial focusing to be independent of the parameters in the other dimension (s), i.e. independent of the X-dimension and/or Z-dimension.

Figure 3:
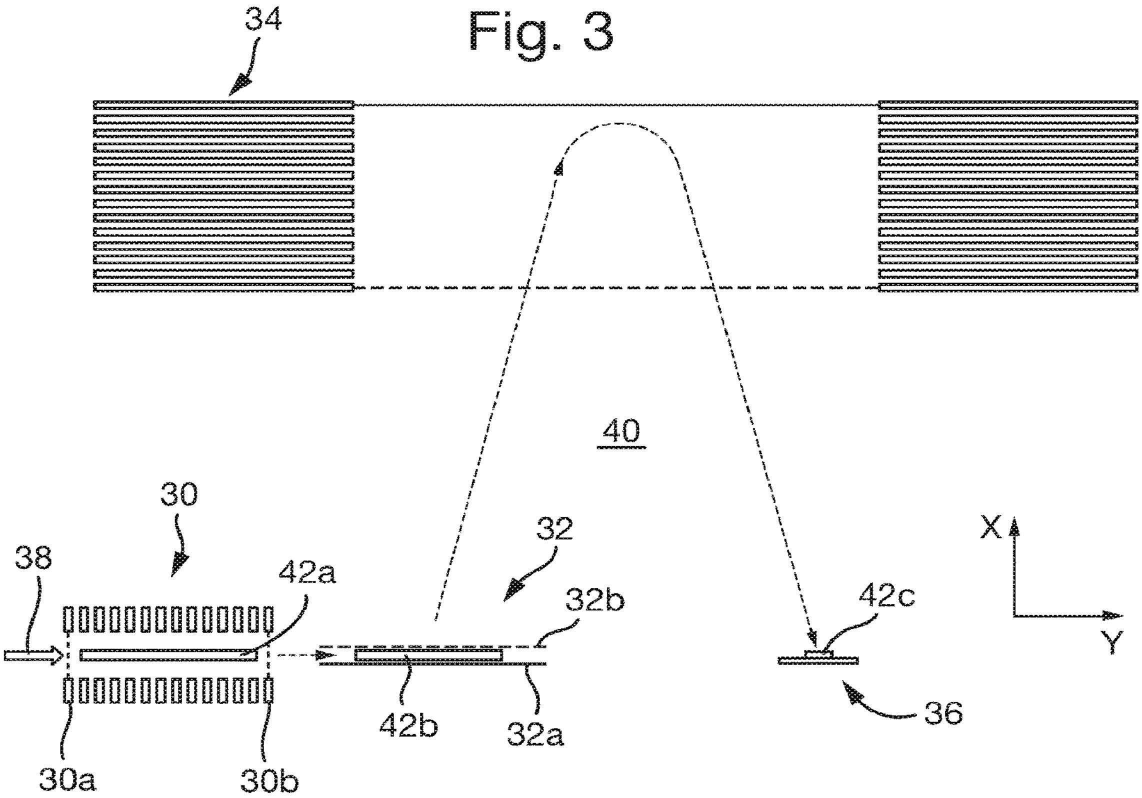
FIG. 3 shows a schematic of a TOF mass analyser according to an embodiment of the present invention.

FIG. 3 shows a schematic of a TOF mass analyser according to an embodiment of the present invention. The mass analyser comprises a first ion accelerator 30, an orthogonal ion accelerator 32, an ion mirror 34 and an ion detector 36. The first ion accelerator 30 comprises at least two electrodes 30*a*,30*b* defining an ion acceleration region therebetween for accelerating ions in a direction towards the ion detector 36. The orthogonal accelerator 32 comprises at least two electrodes 32*a*,32*b* defining an orthogonal acceleration region for accelerating ions in a direction towards the ion mirror 34. The ion mirror 34 comprises a plurality of electrodes for receiving ions and reflecting them back out of the ion mirror 34 towards the detector 36. The detector 36 is arranged such that ions reflected out of the ion mirror 34 are detected by the detector 36.

In operation, ions 38 are transmitted along an ion entrance axis (Y-dimension) into the first ion accelerator 30. A voltage pulse is then applied to one or more electrodes of the first ion accelerator 30 so as to generate a first electric field that accelerates ions in a direction towards the detector 36 (i.e. in the Y-dimension). In a corresponding manner to that described in relation to FIG. 2A, the ions leaving the first ion accelerator 30 begin to spatially focus in the direction of ejection from the first ion accelerator 30 (i.e. in the Y-dimension). It is contemplated that a further ion acceleration region (not shown) may be provided downstream of the first ion accelerator 30, and an electric field may be maintained across the further ion acceleration region that is stronger than the first electric field. This enables the ions leaving the first ion accelerator 30 to begin to spatially focus in the direction of ejection from the first ion accelerator 30 (Y-dimension) in a corresponding manner to that described in relation to FIG. 2B.

The ions ejected from the first ion accelerator 30 are received in the orthogonal accelerator 32. At least one voltage pulse is then applied to at least one of the electrodes in the orthogonal accelerator 30 so as to orthogonally accelerate the ions towards the ion mirror 34 (in the X-dimension). It will be appreciated that a delay is provided between pulsing the ions out of the first ion accelerator 30 and pulsing the ions out of the orthogonal ion accelerator 32 such that the same ions may be pulsed by both devices, i.e. the first ion accelerator and orthogonal accelerator are synchronised. The ions maintain their component of velocity along the direction that they were ejected from the first ion accelerator 30 (Y-dimension) but also gain an orthogonal component of velocity (in the X-dimension). The ions travel from the orthogonal accelerator 32 into an electric-field free region 40 between the orthogonal accelerator 32 and the ion mirror 34. The ions begin to separate according to their mass to charge ratios as they travel towards the ion mirror 34. Voltages are applied to the electrodes of the ion mirror 34 so as to generate an electric field in the ion mirror that causes the ions to be reflected and spatially focused at the position of detector (in the X-dimension). The reflected ions then leave the ion mirror 34 and pass back into the field-free region 40 and travel onwards to the ion detector 36. As described above, the ions separate in the dimension of orthogonal acceleration (X-dimension) as they pass from the orthogonal accelerator 32 to the ion detector 36. As such, for any given ion, the duration of time between the ion being pulsed by the orthogonal accelerator 32 to the time that it is detected at the ion detector 36 can be used to determine its mass to charge ratio.

As the first ion accelerator 30 pulses the ions in the direction towards the ion detector 36 (Y-dimension), the packet of ions pulsed out of the first ion accelerator 30 (and subsequently pulsed out of the orthogonal accelerator 32) will become progressively spatially focused in the direction of pulsing out from the first ion accelerator 30 (Y-dimension) up until a focal point, after which the ions may spatially diverge (in the Y-dimension). The ion detector 36 may be arranged at this focal point. This is illustrated in FIG. 3, which depicts the ion packet 42*a* at the time it is being pulsed out of the first ion accelerator 30 as being relatively long (in the Y-dimension), the ion packet 42*b* at the time it is being pulsed out of the orthogonal accelerator 32 as being shorter (in the Y-dimension), and the ion packet 42*c* at the time it is received at the detector 36 as being even shorter (in the Y-dimension). It is contemplated that the ion detector 36 may be arranged to receive ions upstream or downstream of their spatial focal point (in the Y-dimension), provided that the ion packet has not diverged excessively in the dimension of ejection from the first ion accelerator 30 (Y-dimension), e.g. provided the ion packet is smaller in this dimension at the ion detector 36 than at the time it is pulsed out of the first ion accelerator 30 or orthogonal accelerator 32.

The embodiments described above enable the ion detector 36 to be relatively small in the dimension of ejection from the first ion accelerator 30 (Y-dimension), whilst still receiving a significant proportion or substantially all of the ions in each ion packet. Similarly, the embodiments also enable a relatively large packet of ions (in the dimension of ejection from the first ion accelerator, i.e. Y-dimension) to be ejected from the orthogonal accelerator 32 and received at the ion detector 36.

The embodiments enable the mass analyser to have a relatively high duty cycle. More specifically, the duty cycle is related to the ratio of length of the ion packet in the Y-dimension, when it is accelerated by the orthogonal accelerator 32, to the distance from the centre of the orthogonal accelerator 32 to the centre of the ion detector 36. For any given ion detector 36, the embodiments enable a relatively long ion packet (in the Y-dimension) to be ejected from the orthogonal accelerator 32 and hence enable a relatively high duty cycle.

It will be appreciated that multiple ion packets may be sequentially pulsed from the first ion accelerator to the detector.

The spectrometer may comprise an ion source for supplying ions to the first ion accelerator 30, wherein the ion source is arranged such that said first ion accelerator 30 receives ions from the ion source travelling in the Y-dimension. This enables the beam to pulsed out of the first ion accelerator to be elongated in the Y-dimension (e.g. for increased duty cycle) whilst being small in the X-dimension and Z-dimension.

Although a single reflection TOF mass analyser has been described above, the invention may be applied to other TOF mass analysers, such as a multi-reflecting TOF mass analyser (also known as a folded flight path mass analyser).

Figure 4:
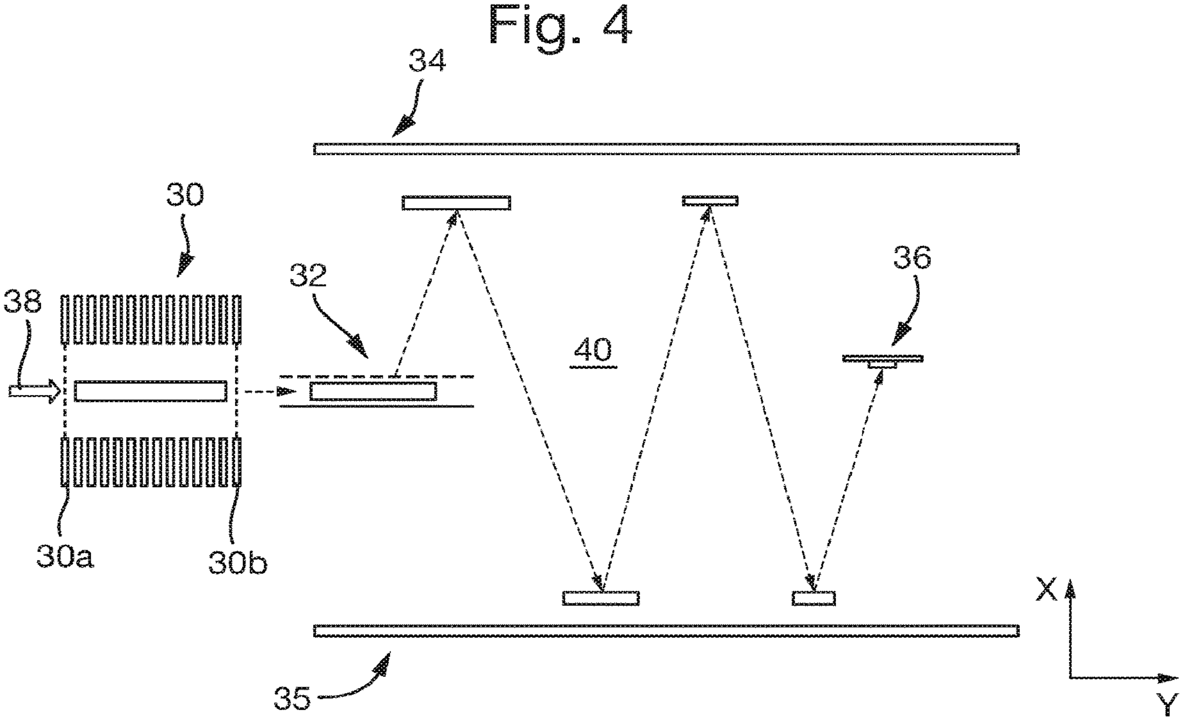
FIG. 4 shows a schematic of a multi-reflecting TOF mass analyser according to an embodiment of the present invention.

FIG. 4 shows a schematic of a planar multi-reflecting TOF mass analyser according to an embodiment of the present invention. This embodiment is the same as that described in relation to FIG. 3. except that the ions are reflected multiple times by ion mirrors 34,35 as they travel from the orthogonal accelerator 32 to the ion detector 36. In the embodiment shown in FIG. 4 the ions are reflected four times between the ion mirrors 34,35, although the mass analyser may be configured to provide a fewer or greater numbers of ion mirror reflections between the orthogonal accelerator 32 and the detector 36. The length of the ion packet in the Y-dimension is illustrated at various positions through the mass analyser. As described above, the length of the ion packet in this Y-dimension reduces as the ions travel from the first ion accelerator 30 to the ion detector 36.

The mass analyser may be configured such that all ions that reach the detector 36 have performed the same number of reflections between the mirrors 34,35, so that the ions have the same flight path length. The first ion accelerator 30 may be controlled so as to eject the ions with velocities that achieve this.

It is also necessary, in this embodiment, for the first ion accelerator 30 to provide the ions with sufficient energy in the Y-dimension such that after they are first reflected by an ion mirror 34, the reflected ions have travelled a sufficient distance in the Y-dimension such that they do not strike the orthogonal accelerator 32 as they travel towards the next ion mirror 35. In order to achieve this for n reflections between the ion mirrors, the length in the in Y-direction of the push-out region of the orthogonal accelerator 32 is configured to be at least n times shorter than the distance in the Y-direction between the push-out region of the orthogonal accelerator 32 and the detector 36.

It is desired that the first ion accelerator 30 accelerates ions in the Y-dimension (with the ion mirror and ion detector planes in the Y-Z plane) and the longitudinal axis of the orthogonal accelerator is aligned in the Y-dimension. This avoids cross-aberrations caused by mixing of X and Y dimension parameters. However, other arrangements such as that in FIG. 5 are contemplated.

Figure 5:
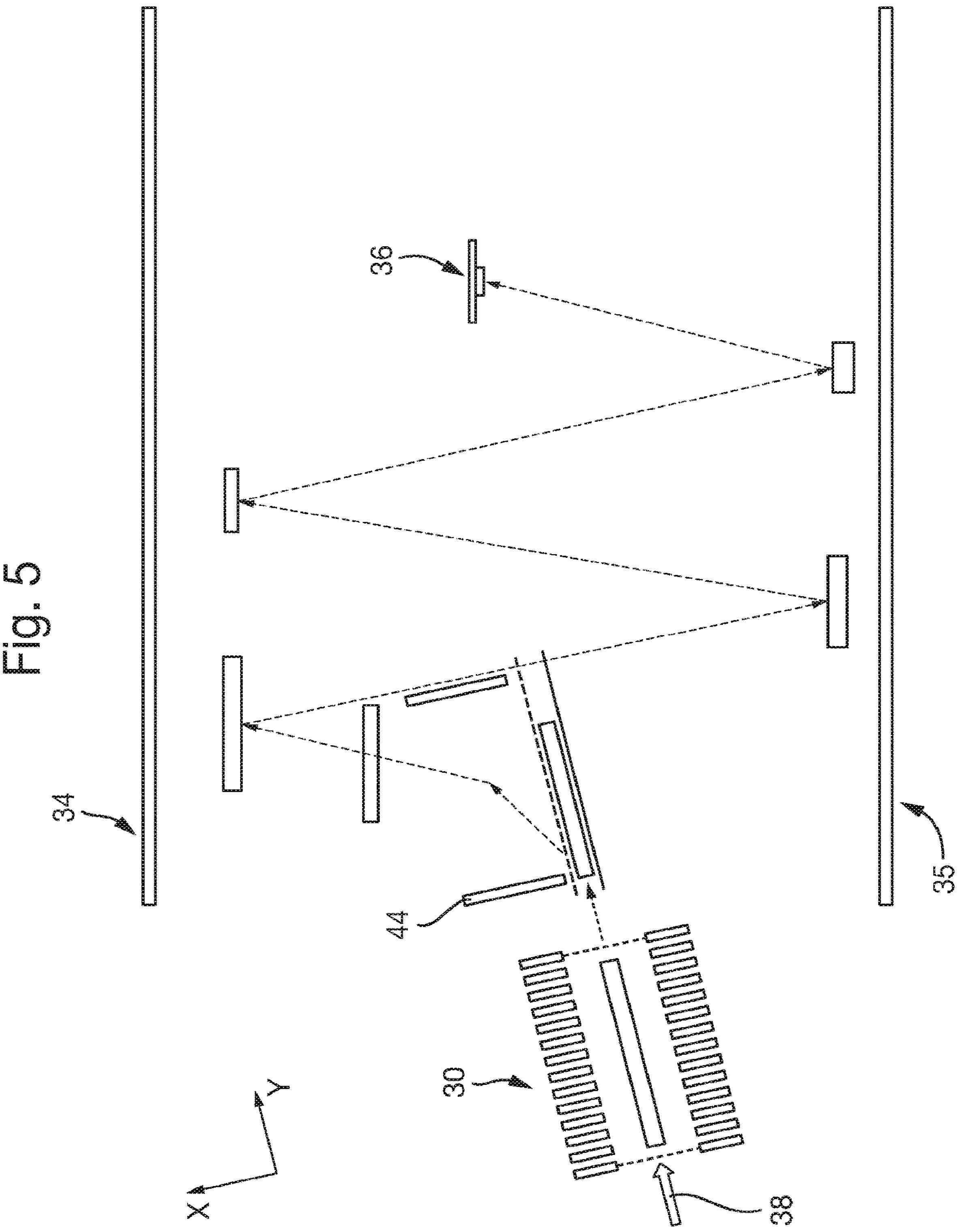
FIG. 5 shows a schematic of another multi-reflecting embodiment in which the first ion accelerator is arranged at an angle to the ion mirror.

FIG. 5 shows a schematic of another embodiment that is similar to that described in relation to FIG. 4, except that the longitudinal axes of the first ion accelerator 30 and orthogonal accelerator 32 are tilted relative to the longitudinal axes of the ion mirrors 34 by angle α. The first ion accelerator 30 may be considered to pulse ions along a Y-dimension and the orthogonal accelerator 32 may be considered to pulse ions along a X-dimension (where the X- and Y-coordinates are tilted in the X-Y plane relative to in the previous embodiments). In this coordinate frame, the ion mirrors 34 are configured to reflect the ions in a reflection dimension that is at an angle to the X-dimension (in the X-Y plane). In this embodiment, an ion packet is pulsed along the Y-dimension by the first ion accelerator 30 so that the ion packet begins to converge along the Y-dimension. The ions are then orthogonally accelerated in the X-dimension towards one of the ion mirrors 34. Between being orthogonally accelerated and reaching the first ion mirror, the mean trajectory of the ions is deflected by an angle of a by a pair of electrodes 44 such that the primary direction in which said convergence occurs is orthogonal to the dimension in which the ions are reflected by the ion mirror(s), i.e. such that the direction in which the convergence occurs is parallel to the mirrors and planar ion detector. This technique may be used to keep the ion packet parallel to the longitudinal axes of the ion mirrors 34 and planar detector 6.

The first ion accelerator 30 described herein may receive the ions in the same direction that it pulses ions out. This enables the ion beam to be maintained relatively small in one or both of the dimensions (e.g. X-dimension) perpendicular to the dimension along which ions are pulsed out of the first ion accelerator 30. For example, the ion beam may be maintained relatively small in the dimension that they are pulsed out of the orthogonal accelerator (X-dimension) and as parallel as possible. The ions may be received, for example, as a substantially continuous ion beam, e.g. from a continuous ion source.

The ion acceleration region in the first ion accelerator 30 may be relatively long in the direction of ion acceleration, so as to provide the mass analyser with a relatively high duty cycle. The electric field for accelerating the ions is desired to be strongly homogeneous, so as to avoid introducing orthogonal (X and Z dimension) ion beam deviations. This acceleration region may therefore be relatively large in the dimensions (e.g. X and Z dimensions) orthogonal to the dimension in which ions are accelerated and/or a plurality of electrodes and voltage supplies may be provided to support a homogenous ion acceleration field.

In the MRTOF embodiments, it is desired to provide a relatively high number n of ion mirror reflections and so the spatial focal distance provided by the first ion accelerator 30 is desired to be relatively long. The kinetic energy of the ions after being accelerated by the first ion accelerator is desired to be much higher (e.g. ~n/2 times higher) than the additional energy acquired during the pulse of the accelerating field in the ion acceleration region of the first ion accelerator.

Two different techniques are contemplated for accelerating ions in the first ion accelerator 30. In a first technique, the ions have a relatively high energy when they arrive in the first ion accelerator (e.g. 50 eV) and the first ion accelerator applies a voltage pulse to the ions to accelerate them (e.g. 10 V). In a second technique the ions have a relatively low energy when they arrive in the first ion accelerator (e.g. 5 eV), the first ion accelerator applies a voltage pulse to the ions to accelerate them (e.g. 18 V) and the ions then pass through a further ion acceleration region across which a potential difference is maintained (e.g. of 37 V). The exemplary energies and voltages described in the first and second techniques provide the ions with about the same energy distribution. In both techniques the spatial focal distance in the dimension of ion acceleration (Y-dimension) is about 11 times longer than the length (in the Y-dimension) of the pulsed ion acceleration region of the first ion accelerator. Accordingly, if an orthogonal accelerator having an orthogonal acceleration region of the same length (in the Y-dimension) is arranged adjacent the first ion accelerator (in the Y-dimension), then there will be a further ten such lengths downstream before the ions are spatially focused in the Y-dimension. This allows ten reflections between the ion mirrors before the spatial focusing occurs, e.g. before the ions hit the detector.

The first technique enables the ion beam to be maintained smaller in the X-dimension, whereas the second technique may be used to provide the mass analyser with a relatively high duty cycle.

Specific examples of the first and second techniques will now be described, for illustrative purposes only, for analysing ions having a maximum m/z of 1000 Th and a pulsed ion acceleration region in the first ion accelerator having a length in the Y-dimension of 62 mm.

In an example according to the first technique, the ions are received in the first ion accelerator having a kinetic energy of 50 eV and a velocity of 3.1 mm/μs (m/z=1000 Th), so as to fill the 62 mm ion acceleration region in 20 μs. A voltage pulse of 10 V is then applied across the 62 mm ion acceleration region such that the ions become spatially focused in the Y-dimension at about 700 mm (after a flight time of ~225 μs). After about 20 μs from being pulsed out of the first ion accelerator, the ions fill the adjacent orthogonal accelerator and a voltage pulse is applied in the X-dimension so as to orthogonally accelerate these ions into a first ion mirror. The ion packet is then reflected 10 times in the X-dimension by the ion mirrors (without impacting on the orthogonal accelerator between the first and second reflections) before arriving at the ion detector. It is required to wait about 20 μs for an ion of m/z 1000 to leave the first ion accelerator (keeping the voltage pulse applied), and then another 20 μs for the ions to fill the orthogonal accelerator. Whilst the ions are filling the orthogonal accelerator, a second packet of ions (e.g. having an upper m/z of 1000) may fill the first ion accelerator. The second packet of ions can therefore be accelerated out of the first ion accelerator at a time of 40 μs. However, if each ion packet includes a range of mass to charge ratios, then ions from different pulses may arrive at the detector at times which overlap, since the heaviest and slowest ions in one pulse may reach the detector after the lightest and fastest ions from a subsequent pulse. For any given pulse, the lowest mass registered at the ion detector will be the one moving twice as fast as the highest mass desired to be analysed (1000 Th), i.e. a mass of 250 Th, and will arrive at the detector in 112 μs. The duty cycle of the mass analyser depends on the period of the push-out pulses. For the example wherein the upper limit of the mass range detected is m/z=1000 Th, and taking into account the absence of masses below 250 Th, a cycle time of 112 μs can be provided and the duty cycle is then approximately 20/112, i.e. 18%.

In an example according to the second technique, the ions are received in the first ion accelerator having a kinetic energy of 5 eV and a velocity 0.98 mm/μs (m/z=1000 Th), so as to fill the 62 mm ion acceleration region in 63 μs. A voltage pulse of about 18 V is then applied across the 62 mm ion acceleration region so as to accelerate ions into a further (short) ion acceleration region across which a potential difference of 37 V is maintained. As with the first technique, this provides the ions with the same maximum energy (60 eV) and causes the ions to become spatially focused in the Y-dimension at about 700 mm. The 18 V pulse increases the energy of the last ions up to 23 eV and a velocity 2.1 mm/μs. These ions therefore leave the pulsed acceleration region after 30 μs and are then accelerated to 60 eV in the downstream further acceleration region. The orthogonal acceleration is delayed by 30 μs. In contrast to the first technique, in the second technique the ion packet stretches to 93 mm at the orthogonal acceleration region, instead of 62 mm. If it is still desired to have the same number of reflections as in the first technique (i.e. n=10), then it is required to sacrifice ⅓ of the ions and still use an orthogonal acceleration region having a length of 62 mm. As such, it is still possible to use a 20 μs delay before pulsing the orthogonal accelerator (i.e. the moment that the first ions reach the far end of the orthogonal acceleration region). In this case, the low-mass cut-off will again be 250 Th and so a cycle time of 112 μs can again be used to analyse ions having a mass range of 250-1000. The duty cycle of the mass analyser in this case is about 0.67×63 μs/112, i.e. 37%. Longer cycle times may be used to analyse ions of higher mass to charge ratios, although this has a corresponding lower efficiency of using the incoming ion beam (i.e. a lower duty-cycle). Also, if a gap is provided between the first ion acceleration region and the orthogonal accelerator then the high mass cut-off of the mass range able to be analysed will be defined by the distance of this gap.

Although the present invention has been described with reference to preferred embodiments, it will be understood by those skilled in the art that various changes in form and detail may be made without departing from the scope of the invention as set forth in the accompanying claims.

For example, although embodiments have been described in which the ions are received in the first acceleration region 30 as a continuous ion beam, the ions may be received as a non-continuous or pulsed ion beam. The mass spectrometer may therefore comprise either a pulsed ion source or other types of ion sources. For example, the ion source may be an electron ionisation ion source or a laser ablation ionisation source (either as vacuum ion sources or ion sources at ambient gas pressure).

The ionisation source may be arranged inside the first acceleration region. Alternatively, or additionally, the ionisation source may be configured to emit photons, charged particles (such as electrons or reagent ions) or molecules that interact with analyte so as to ionise it, wherein these photons, particles or molecules are directed into the first ion accelerator 30 for ionising analyte therein. The photons, particles or molecules may be directed along the axis of the first accelerator (Y-dimension). This may increase the sensitivity of the analyser.

The analyser may be configured such that the final ion energy in the Y-dimension is related to the ion energy provided in the X-dimension such that the ion speeds in these dimensions are proportional to their respective effective flight path lengths along these dimensions. For example, the flight path of the ions from the first ion accelerator 30 to the ion detector 36 in the Y-dimension may be significantly smaller than the flight path of the ions in the X-dimension.

Although the ions have only been described as being reflected by the ion mirror(s) in the X-dimension, it is contemplated that the ions may also be reflected in the Y-dimension so as to extend the length of the ion flight path. For example, the ions may be pulsed in the Y-dimension by the first ion accelerator, reflected in the X-dimension between two ion mirrors, reflected in the Y-dimension back towards the first ion accelerator, reflected between the ion mirrors in the X-dimension and then onto the detector.

The voltage pulses applied to the first ion accelerator 30 and/or the orthogonal acceleration region 32 are desirably maintained until all ions of interest have exited the first ion accelerator 30 and/or the orthogonal acceleration region 32, respectively. This provides the all masses of interest with the same energy. In contrast, a shorter pulse would provide the same momentum to all masses, which would spatially focus different masses at different distances in the Y-dimension.

A wire mesh may be provided between the first ion accelerator 30 and the orthogonal accelerator 32 so as to prevent the pulsed electric field from either device entering the other device.

Embodiments are also contemplated in which the ions may also be accelerated in the Z-dimension in a corresponding manner to that in which the ions are accelerated in the Y-dimension by the first ion accelerator 30. This enables the ions to be spatially focused in the Z-dimension as well as the Y-dimension. This may be useful for embodiments in which the detector 36 is displaced from the orthogonal accelerator 32 in both the Y-dimension and the Z-dimension.

Figure 6:
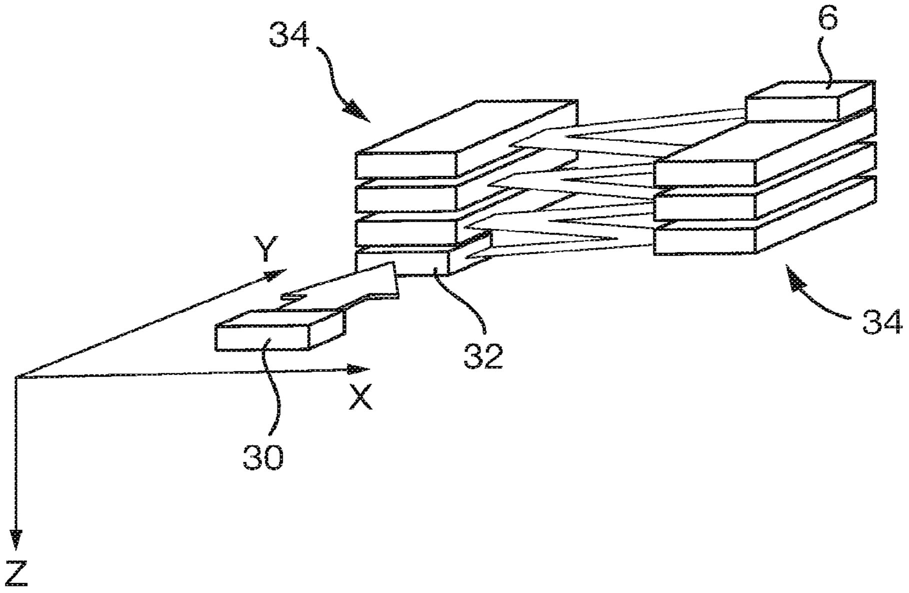
FIG. 6 shows a schematic of a another multi-reflecting embodiment in which the ions are urged in a direction so as to avoid striking the orthogonal accelerator after being reflected in the ion mirrors.

FIG. 6 shows an embodiment that is substantially the same as that shown in FIG. 4, except that the ion detector 6 is displaced in the Z-dimension relative to the first ion accelerator 32 and orthogonal accelerator 34. The mass analyser in this embodiment is configured to urge ions in the Z-dimension such that the ions travel in the Z-dimension towards the detector 6. As the ions are urged in the Z-direction, the ions are unable to impact on the orthogonal accelerator 32 as they are reflected between the ion mirrors 34. The orthogonal accelerator 32 may therefore be relatively long in the Y-dimension.

Although planar ion mirror geometries in which ions are reflected in a single plane have been described, other geometries are also contemplated.

Figure 7:
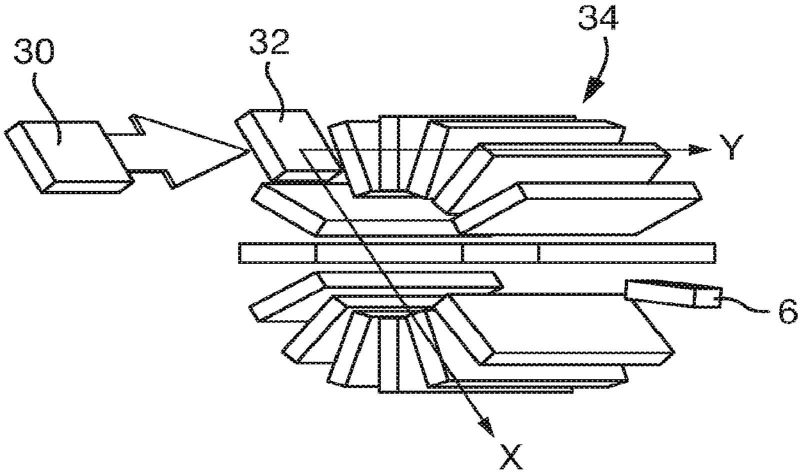
FIG. 7 shows a schematic of a another multi-reflecting embodiment in which the ions are reflected by the ion mirrors so as to avoid striking the orthogonal accelerator.

FIG. 7 shows an embodiment that operates in substantially the same manner as FIG. 4, except that rather than having two opposing elongated ion mirrors that reflect the ions multiple times in a single plane, multiple elongated ion mirrors are provided circumferentially around a longitudinal axis (extending in the Y-dimension) and that reflect the ions in multiple different planes as they travel between the orthogonal accelerator 32 and the ion detector 6. In operation, an ion packet is pulsed out of the first ion accelerator 30 in the Y-dimension, so that it begins to converge in the Y-dimension in the manner described herein above. The ion packet then enters the orthogonal accelerator 32, wherein it is pulsed in the X-dimension into a first of the ion mirrors 34 located at a first circumferential position. The first ion mirror reflects the ions at an angle (in the X-Z plane) to the axis along which it received the ions and such that the ions enter into a second ion mirror that is arranged in a second circumferential position, substantially diametrically opposite the first mirror. The second mirror reflects the ions along an axis that is at an angle (in the X-Z plane) to the axis along which it received the ions, and into a third ion mirror that is arranged in a third circumferential position, substantially diametrically opposite the second mirror. This process of reflecting ions into different mirrors is repeated until the ions strike the detector 6. In the embodiment shown, the ions are reflected in the above manner between 14 mirrors, although other embodiments are contemplated with fewer or a greater number of mirrors. As the ions are reflected by each ion mirror at an angle (in the X-Z plane) to the axis along which it receives ions, the ions do not impact on the orthogonal accelerator 30 after being reflected, even if the orthogonal accelerator 30 is relatively long.

The invention claimed is:

1. A Time of Flight mass analyser comprising:

at least one ion mirror for reflecting ions;

an ion detector arranged for detecting the reflected ions;

a first pulsed ion accelerator for accelerating an ion packet in a first dimension (Y-dimension) towards the ion detector so that the ion packet spatially converges in the first dimension as it travels to the detector; and a pulsed orthogonal accelerator for orthogonally accelerating the ion packet in a second, orthogonal dimension (X-dimension) into one of said at least one ion mirrors;

wherein the first ion accelerator is configured to pulse the ion packet out having a first length in the first dimension (Y-dimension), wherein the orthogonal accelerator is configured to pulse the ion packet out having a second length in the first dimension (Y-dimension), and wherein the detector is arranged such that the ion packet has a third length in the first dimension (Y-dimension) when it impacts the detector, wherein the third length is shorter than the first length and the second length.

2. The mass analyser of claim 1, wherein the first ion accelerator comprises a voltage supply for applying a voltage pulse that accelerates the ion packet in the first dimension (Y-dimension) such that the ion packet is spatially focused in the first dimension to a spatial focal point that is downstream of the first ion accelerator, and wherein the detector is arranged in the first dimension at the spatial focal point.

3. The mass analyser of claim 1, comprising electrodes defining a further ion acceleration region downstream of the first ion accelerator and a voltage supply for applying a potential difference across the further ion acceleration region so as to accelerate ions that have been pulsed out of the first ion accelerator in the first dimension (Y-dimension).

4. The mass analyser of claim 3, wherein the voltage supply is configured to generate an electric field within the further ion acceleration region that has a magnitude in the first dimension (Y-dimension) that is greater than the magnitude of the pulsed electric field in the first dimension within the first ion accelerator.

5. The mass analyser of claim 1, wherein the at least one ion mirror comprises a first ion mirror spaced apart from a second ion mirror, wherein the ion mirrors and detector are arranged and configured such that ions pulsed out of the orthogonal accelerator pass into the first ion mirror and are reflected between the ion mirrors and then onto the detector.

6. The mass analyser of claim 5, wherein the first ion accelerator is configured to pulse the ion packet in the first dimension (Y-dimension) so that the ions have sufficient energy in this dimension that they do not impact upon the orthogonal accelerator after they have been reflected from the first ion mirror.

7. The mass analyser of claim 5, wherein the mass analyser is configured to reflect the ion packet a total of n times in the ion mirrors; wherein a first distance, in the first dimension (Y-dimension), is provided between the centre of the ion extraction region of the orthogonal accelerator and the centre of the detector; and wherein the length of the extraction region of the orthogonal accelerator, in the first dimension (Y-dimension), is at least n times shorter than said first distance.

8. The mass analyser of claim 1, comprising a mesh electrode at the exit of the ion accelerator and/or between the first ion accelerator and orthogonal accelerator.

9. The mass analyser of claim 1, comprising a first voltage supply for applying a voltage to the first ion accelerator to pulse out the ion packet in the first dimension, a second voltage supply for applying a voltage to the orthogonal accelerator to pulse out the ion packet in the second dimension, and a controller for delaying the start time of the second pulse relative to the first pulse and/or the duration of the second pulse so that at least some of the ions pulsed out of the first ion accelerator are pulsed out of the orthogonal accelerator to the detector.

10. The mass analyser of claim 9, wherein the controller is configured to delay the timing of the second pulse relative to the first pulse based on a pre-set or selected upper and/or lower threshold mass to charge ratio desired to be analysed so that the ions reaching the detector have masses below the upper threshold mass to charge ratio and/or above the lower threshold mass to charge ratio.

11. The mass analyser of claim 10, comprising an input interface for inputting into the mass analyser the upper and/or lower threshold mass to charge ratio desired to be analysed.

12. The mass analyser of claim 1, comprising one or more vacuum pump and vacuum chamber for maintaining the first ion accelerator and/or orthogonal accelerator at a pressure of either: $\leq 10^{-3}$ mbar; $\leq 0.5\times10^{-4}$ mbar; $\leq 10^{-4}$ mbar; $\leq 0.5\times10^{-5}$ mbar; $\leq 10^{-5}$ mbar; $\leq 0.5\times10^{-6}$ mbar; $\leq 10^{-6}$ mbar; $\leq 0.5\times10^{-7}$ mbar; or $\leq 10^{-7}$ mbar.

13. A mass spectrometer comprising the mass analyser of claim 1 and an ion source for supplying ions to the mass analyser.

14. The mass spectrometer of claim 13, wherein the ion source is a continuous ion source.

15. The mass spectrometer of claim 13, wherein the mass spectrometer is configured to supply ions to the first ion accelerator in the first dimension (Y-dimension).

16. The mass spectrometer of claim 13, comprising either: an ionisation source inside the first ion accelerator; or an ionisation source configured to emit photons, charged particles or molecules into the first ion accelerator for ionising analyte therein.

17. The mass analyser of claim 1, wherein the ion packet is not reflected in the first dimension (Y-dimension) as it travels from the pulsed orthogonal accelerator to the ion detector.

18. A method of Time of Flight mass analysis comprising:

providing a mass analyser as claimed in claim 1;

pulsing an ion packet out of the first pulsed ion accelerator so that the ion packet spatially converges in the first dimension (Y-dimension) as it travels to the detector;

orthogonally accelerating the ion packet in a second dimension (X-dimension) in the orthogonal accelerator so that the ions travel into one of said at least one ion mirror;

reflecting the ions in the at least one ion mirror such that the ions are reflected onto the detector; and determining the mass to charge ratio of the detected ions.

19. A method of mass spectrometry comprising a method as claimed in claim 18.

* * * * *